United States Patent
Wang et al.

(10) Patent No.: US 8,339,813 B2
(45) Date of Patent: Dec. 25, 2012

(54) BURST MODE RESONANT POWER CONVERTER WITH HIGH CONVERSION EFFICIENCY

(75) Inventors: Yen-Lung Wang, Taipei Hsien (TW); Wei-Liang Lin, Taipei Hsien (TW)

(73) Assignee: Acbel Polytech Inc., Tamshui Chen, Taipei Hsien (TW)

(*) Notice: Subject to any disclaimer, the term of this patent is extended or adjusted under 35 U.S.C. 154(b) by 227 days.

(21) Appl. No.: 12/841,411

(22) Filed: Jul. 22, 2010

(65) Prior Publication Data

US 2011/0085354 A1    Apr. 14, 2011

(30) Foreign Application Priority Data

Oct. 8, 2009   (TW) .............................. 98134092 A

(51) Int. Cl.
*H02M 3/335* (2006.01)
(52) U.S. Cl. .................................................. 363/21.02
(58) Field of Classification Search ............... 363/21.02, 363/21.08–21.18
See application file for complete search history.

(56) References Cited

U.S. PATENT DOCUMENTS 5,498,995 A *   3/1996   Szepesi et al. ............... 327/538
2010/0232183 A1 *   9/2010   Yang ......................... 363/21.02

* cited by examiner

*Primary Examiner* — Jue Zhang
(74) *Attorney, Agent, or Firm* — C. G. Mersereau; Nikolai & Mersereau, P.A.

(57) ABSTRACT

A burst mode resonant power converter with high conversion efficiency has a rectifier, a power factor correction circuit, a resonant circuit, a controller, and a burst mode triggering unit. The maximum frequency switching end of the controller is connected to a maximum frequency variable circuit. When the load is medium or heavy, the maximum frequency variable circuit increases the maximum switch frequency of the controller. When the load is in the no-load or the light conditions, it reduces the maximum switch frequency thereof. Therefore, the controller reduces the number of times that the resonant circuit switches the bridge switch circuit. The conduction cycle of the 50% pulse signal output to the bridge switch circuit becomes longer. Larger energy can be transmitted at a time to the secondary coil of the transformer. This increases the overall efficiency.

16 Claims, 10 Drawing Sheets

BURST MODE RESONANT POWER CONVERTER WITH HIGH CONVERSION EFFICIENCY

BACKGROUND OF THE INVENTION

1. Field of the Invention

The invention relates to a burst mode LLC resonant power converter and, in particular, to a burst mode resonant power converter with high conversion efficiency.

2. Description of Related Art

As shown in FIG. 7, a burst mode LLC resonant power converter in the prior art includes a rectifier 70, a power factor correction (PFC) circuit 71, a resonant circuit 72, a controller 73, and a burst mode triggering unit 74.

The rectifier 70 is connected to an AC power supply to convert AC power to a sinusoidal DC power for output.

The PFC circuit 71 is connected to the rectifier 70 to detect the voltage and current of the sinusoidal DC power and to adjust the PFC thereof, thereby outputting a DC power. The PFC circuit 71 includes an energy-storing inductor L1, a power switch S1, and an energy-storing capacitor $C_{bulk}$. One end of the energy-storing inductor L1 is connected to the output end of the rectifier 70, and the other end is connected to the power switch S1 and the energy-storing inductor L1.

The resonant circuit 72 includes a transformer T1, a resonant unit Lr and Cr, a half bridge switch circuit 721, and an output capacitor $C_{OUT}$. The resonant unit Lr could be the leakage inductor of the primary coil of the transformer T1 or an independent inductor. The transformer T1 has a primary coil and a center-tapped secondary coil. The resonant unit Lr and Cr is connected between the bridge switch circuit 721 and the primary coil. The output capacitor $C_{OUT}$ is connected to the center-tapped secondary coil. The resonant unit Lr, Cr is connected to the bridge switch circuit 721. The resonant unit Lr, Cr of the resonant circuit 72 is an LC circuit. Since the LC circuit Lr, Cr is connected to the primary coil of the transformer T1, it forms a resonant circuit with a magnetizing inductor (not shown) of the primary coil. The resonant circuit 72 has two resonant frequencies. The first resonant frequency is given by the magnetizing inductor of the primary coil and the resonant capacitor $C_r$ of the LC circuit. The second resonant frequency is given by the magnetizing inductor (not shown), leakage inductance and the resonant capacitor $C_r$.

The controller 73 includes a reference voltage input end PFCSV, multiple output ends PFCG, GHS, HLS, an output voltage feedback end FB, an maximum switch frequency setting end RFMAX, and a burst mode triggering end SNOUT. The reference voltage input end PFCSV is connected to the energy-storing capacitor $C_{bulk}$ via a voltage divider R1, R2. The output ends PFCG, GHS, HLS are connected to the power switch S1 of the PFC 71 and the bridge switch circuit 721 of the resonant circuit. The output voltage feedback end FB is connected to the filter capacitor $C_{OUT}$ of the resonant circuit 72, i.e., the output end of the power converter, via a photo coupler 731. The maximum switch frequency setting end is connected with a fixed resistor R10 in order to determine the maximum switch frequency.

The burst mode triggering unit 74 is connected to the burst mode triggering end SNOUT of the controller 73 and the photo coupler 731 to detect the voltage output by the power converter. The burst mode triggering unit 74 determines whether the load status is in a no-load condition or a light-load condition and sends determined results to the burst mode triggering end SNOUT. The burst mode triggering unit 74 comprises a comparator 741 and an electronic switch Sb. An inverting input end of the comparator 741 is connected to the photo coupler 731, and a non-inverting input end is connected to a fixed reference voltage. An output end of the comparator 741 is connected to the electronic switch Sb to determine its on and off. The electronic switch Sb is connected to the burst mode triggering end SNOUT of the controller 73.

The controller 73 outputs a burst width signal whose duty cycle is 50% to the bridge switch circuit 721, making the high and low active switches HS, LS of the bridge switch circuit 721 become conductive alternately. In this case, the power converter outputs a stable DC voltage. When the load is in the no-load condition or the light-load condition, the output voltage of the power converter increases. The electrical current through the photo coupler 731 rises, pulling down the potential of the output voltage feedback end FB. Therefore, the controller 73 performs switch controls on the half-bridge switch circuit according to the maximum switch frequency determined by the fixed resistor R10 connected with the maximum switch frequency setting end RFMAX. With reference to FIG. 9, when operating at the maximum switch frequency, the overall gain decreases and, therefore, the output voltage drops. If the output voltage still remains in the no-load condition or the light-load condition, the electrical current may be too large. The potential on the output voltage feedback end FB is still low. In this case, the comparator 741 outputs a high potential signal to the electronic switch Sb. As a result, the electronic switch Sb becomes conductive and pulls down the potential on the burst mode triggering end SNOUT, triggering the burst mode of the controller 73. With reference to FIG. 8 two sets of 50% burst width signal waveforms are output from the controller 73 to the bridge switch circuit 721 under the burst mode. After the controller 73 enters the burst mode, each 50% burst width signal will be inserted with several blank cycles, further dropping the output voltage to maintain a stable voltage output.

According to the above description, even though a lower gain is obtained by operating below the maximum switch frequency to suppress the rise in the output voltage under the no-load condition or the light-load condition, the switching loss increases. The switching loss inevitably lowers the efficiency of the power converter at light or no load. This may not satisfy the international standard for no-load or light-load conditions. It is thus imperative to provide a better solution.

To overcome the shortcomings, the present invention provides a burst mode resonant power converter with high conversion efficiency to mitigate or obviate the aforementioned problems.

SUMMARY OF THE INVENTION

In view of the foregoing, the invention provides a burst mode resonant power converter with high conversion efficiency at a light load, thereby increasing the overall conversion efficiency thereof.

To achieve the above objective, the resonant power converter includes a filter circuit, a PFC circuit, a power factor controller, a resonant circuit, a resonant controller, and a burst mode triggering unit. A maximum switch frequency setting end of the resonant controller is connected to a maximum frequency variable circuit. The maximum frequency variable circuit includes a load state detecting unit, a first resistor, a second resistor, and a switch. The first resistor is connected to the maximum switch frequency setting end of the resonant controller. The second resistor is connected with a switch in series and then connected with the first resistor in parallel. The control end of the switch is connected to the load state detecting unit.

When the load state detecting unit determines that there is no load or light load, the switch is driven to turn off so that the first resistor and the second resistor are not connected in parallel. Only the first resistor is connected to the maximum switch frequency setting end. The equivalent resistance is pulled to be higher than medium/heavy load, thereby lowering the maximum switch frequency of the controller. That is, the number of times to switch the bridge switch circuit is reduced to decrease the switching loss. The resonant controller skips more cycles to reduce the output voltage. Besides, the cycle of the 50% pulse signal is controlled to become longer. Therefore, larger energy can be transmitted to the secondary coil of the transformer at a time, maintaining a basic voltage on the output end. Therefore, the conversion efficiency of the disclosed power converter at light loads can effectively increase.

Another objective of the invention is to provide a resonant power converter whose output end provides a more stable voltage. The reference voltage end of the power factor controller is connected to a variable reference voltage circuit, which includes a voltage divider, a resistor, and a switch. The switch is connected with the resistor in series, and then to the voltage divider and the burst mode triggering unit. It is in connection with the electronic switch of the burst mode triggering unit. That is, when the burst mode triggering unit determines that the current load condition is the no-load condition or the light-load condition, the electronic switch turns on. In this case, the potential on the burst mode triggering end of the power factor controller is ground. The switch of the variable reference voltage circuit turns on to make the resistor connect with one resistor of the voltage divider in parallel. The reference voltage on the reference voltage input end of the power factor controller changes the voltage of the energy-storing capacitor.

The change in the reference voltage of the power factor controller modifies the conduction time of the power switch. The voltage of the energy-storing capacitor increases. The resonant controller elongates the conduction cycle of the bridge switch circuit. Therefore, more energy can be delivered to the secondary side of the transformer during the conduction cycle. This reduces the number of times to switch the bridge switch circuit. In summary, the invention enhances the conversion efficiency during the no-load condition or the light-load condition and stabilizes the voltage on the output end of the power converter.

DETAILED DESCRIPTION OF THE PREFERRED EMBODIMENT

Figure 1:
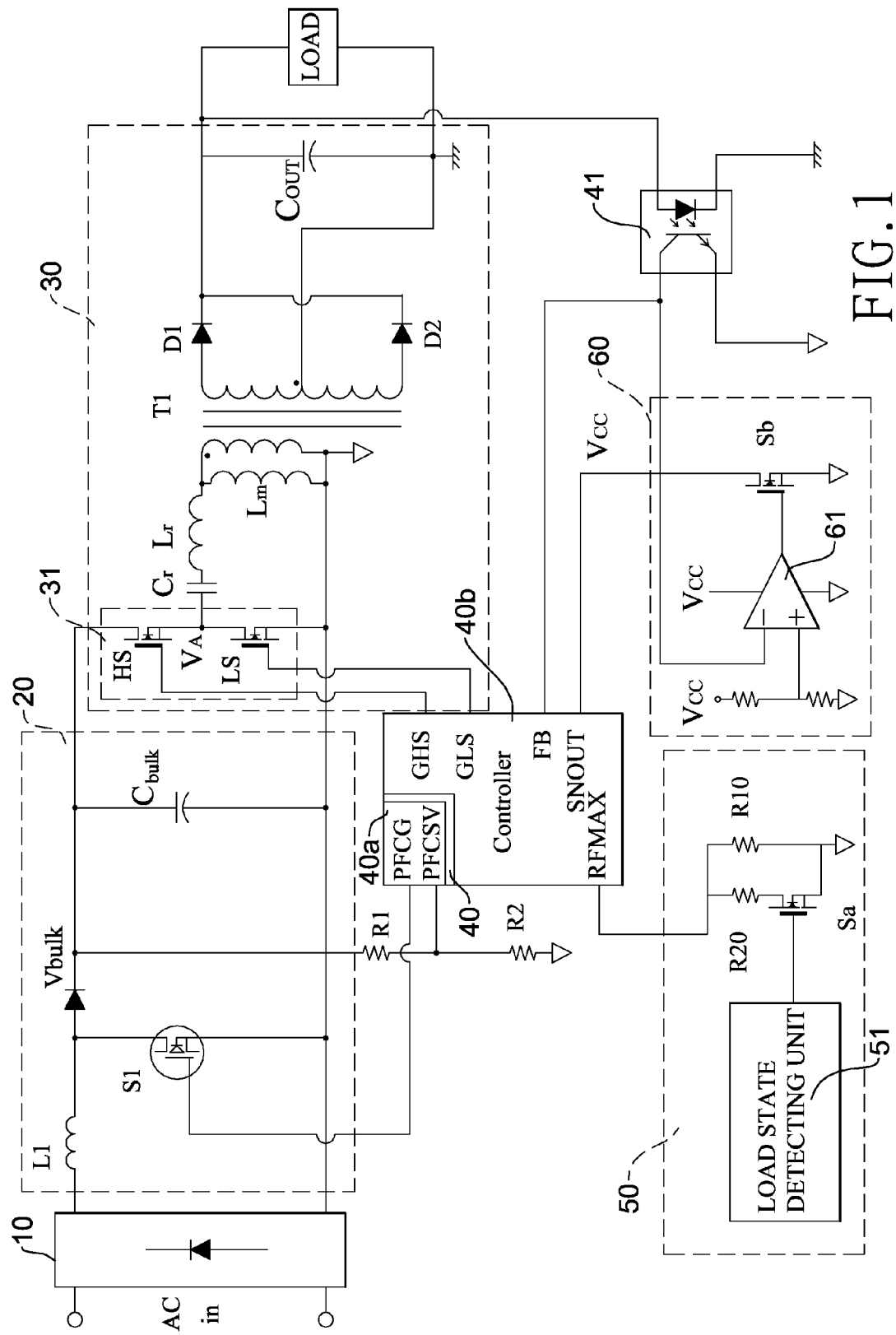
FIG. 1 is a circuit diagram of a first embodiment of the invention.

With reference to FIG. 1, a burst mode resonant power converter with high conversion efficiency in accordance with the present invention comprises a rectifier 10, a PFC circuit 20, a resonant circuit 30, a controller 40, and a burst mode triggering unit 60.

The rectifier 10 is connected to an AC power supply to convert the AC power into a sinusoidal DC power for output.

The PFC circuit 20 is connected to the rectifier 10 to detect the voltage and current of the sinusoidal DC power, thereby adjusting the power factor thereof and outputting DC power. The PFC circuit 20 includes an energy-storing inductor L1, a power switch S1 and an energy-storing capacitor $C_{bulk}$. One end of the energy-storing inductor L1 is connected to the output end of the rectifier 10, and the other end is connected to the power switch S1 and the energy-storing capacitor $C_{bulk}$.

The resonant circuit 30 comprises a transformer T1, a resonant unit Cr, Lr, a bridge switch circuit 31 and an output capacitor $C_{OUT}$. The transformer T1 has a primary coil and a secondary coil. The resonant unit Cr, Lr is connected between the bridge switch circuit 31 and the primary coil. The output capacitor $C_{OUT}$ is connected to the secondary coil. The resonant unit Cr, Lr is connected to the bridge switch circuit 31. In this embodiment, the secondary coil has a center tap. The bridge switch circuit 31 is a half bridge switch circuit, including a high side switch HS and a low side switch LS connected in series. The resonant circuit 30 is an LLC resonant circuit. That is, the resonant unit Cr, Lr is an LC circuit. Since the LC circuit is connected to the primary coil of the transformer T1, it forms an LLC circuit with the magnetizing inductor Lm on the primary coil. The inductance Lr of the LC circuit is provided by the leakage inductance of the primary coil of the transformer T1. Alternatively, the leakage inductor Lr and the magnetizing inductor Lm can be provided by independent inductors. The resonant circuit 30 has two resonant frequencies. The first resonant frequency is given by the leakage inductor Lr on the primary coil and the resonant capacitor Cr in the LC circuit. The second resonant frequency is determined by the leakage inductor Lr, the magnetizing inductor Lm and the resonant capacitor Cr. Besides, the resonant circuit can be an LC resonant circuit, LCC resonant circuit, or SRC resonant circuit.

The controller 40 includes a power factor controller 40a and a resonant controller 40b. The power factor controller 40a has a reference voltage input end PFCSV and an output end PFCG. The resonant controller 40b has several output ends GHS, GLS, an output voltage feedback end FB, a maximum switch frequency setting end RFMAX, and a burst mode triggering end SNOUT. The reference voltage input end PFCSV is connected to the energy-storing capacitor $C_{bulk}$ via a voltage divider R1,R2. The voltage divider R1,R2 is comprised of an upper resistor R1 and a lower resistor R2 connected in series. The serial connection node is connected to the reference voltage end PFCSV of the power factor controller 40a. The upper resistor R1 is connected to the energy-storing capacitor $C_{bulk}$ of the PFC circuit 20, then to the DC power. The output end PFCG of the power factor controller 40a is connected to the power switch S1 of the PFC circuit 20. The output ends GHS, GLS of the resonant controller 40b are connected respectively to the bridge switch circuit 31 of the resonant circuit 30. The output voltage feedback end FB is connected to the output capacitor $C_{OUT}$ (i.e., the output end of the power converter) of the resonant circuit 30 via a photo coupler 41. The maximum switch frequency setting end RFMAX is connected to a maximum frequency variable circuit 50. Besides, the power factor controller 40a and the resonant controller 40b can be separate controllers or integrated as a combined controller.

The burst mode triggering unit 60 is connected to the burst mode trigging end SNOUT of the controlled 40 and the photo coupler 41. The burst mode triggering unit 60 detects the voltage output from the power converter to determine whether to enter the light load mode and to respond to the burst mode trigging end SNOUT. The burst mode triggering unit 60 has a comparator 61 and an electronic switch Sb. An inverting input end of the comparator 61 is connected to the photo coupler 41, and a non-inverting input end is connected to a fixed reference voltage. An output end of the comparator 61 is connected to the electronic switch Sb to determine the on and off thereof. The electronic switch Sb is connected to the burst mode triggering end SNOUT of the controller 40.

The maximum frequency variable circuit 50 comprises a load state detecting unit 51, a first resistor R10, and a second resistor R20.

Figure 2A:
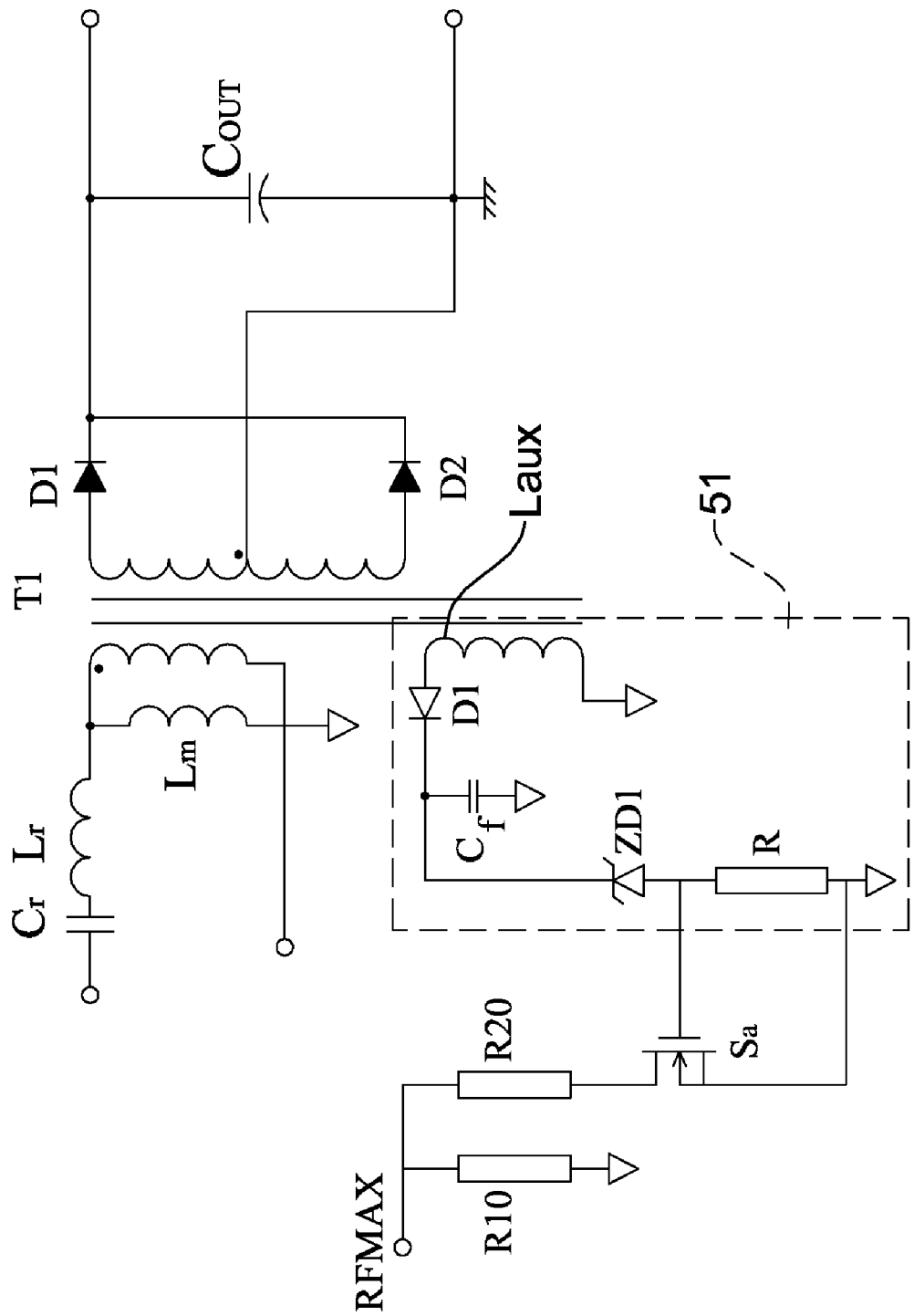
FIG. 2A is a detailed circuit diagram of a maximum frequency variable circuit in FIG. 1 according to a first embodiment.
Figure 2B:
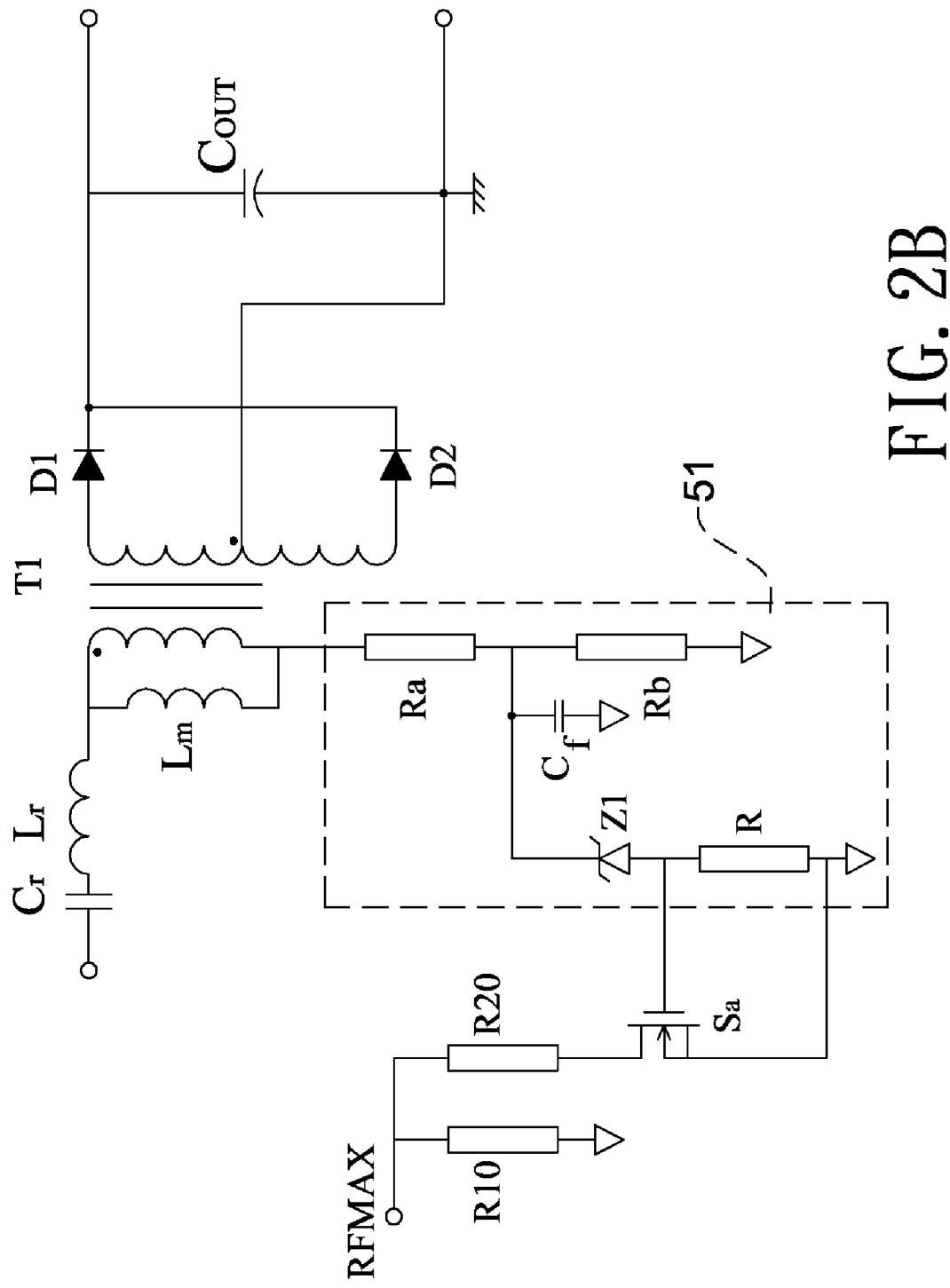
FIG. 2B is a detailed circuit diagram of a maximum frequency variable circuit in FIG. 1 according to a second embodiment.

The load state detecting unit 51 is coupled to the transformer T1 to detect the resonant current thereof, thereby determining the load state. With reference to FIG. 2A, in this embodiment, the load state detecting unit 51 includes an auxiliary coil Laux and a filter capacitor $C_f$. The auxiliary coil Laux is coupled to the primary coil of the transformer T1 and is connected to the filter capacitor $C_f$ via a diode D1, thereby detecting the resonant current of the transformer T1 and converting it to a corresponding voltage. When the load condition is the no-load condition or the light-light condition, the voltage of the filter capacitor $C_f$ is smaller; otherwise, it is higher. With reference to FIG. 2B, the load state detecting unit 51a may comprise a voltage divider Ra, Rb and a filter capacitor $C_f$. The voltage divider Ra,Rb is connected to the primary coil of the transformer T1. The filter capacitor $C_f$ is connected to one of the resistors in parallel. It changes its voltage according to the current variation on the primary coil.

The first resistor R10 is connected to the maximum switch frequency setting end RFMAX of the controller 40.

The second resistor R20 is connected with a switch Sa in series and then both are further connected to the first resistor R10 in parallel. The controller end of the switch Sa is connected to the load state detecting unit 51. In this embodiment, the control end of the switch Sa is connected to the filter capacitor $C_f$ through a Zener diode ZD1, and the switch Sa is a MOSFET.

When the current load is medium or heavy, the filter capacitor $C_f$ has a higher voltage and the switch Sa is turned on. Since the switch Sa is turned on, the first and second resistors R10, R20 are connected in parallel. For the maximum frequency setting end RFMAX of the controller 40b, it is connected with a lower equivalent resistance. The maximum switch frequency $F_{MAX2}$ of the resonant controller 40b therefore increases.

Figure 3:
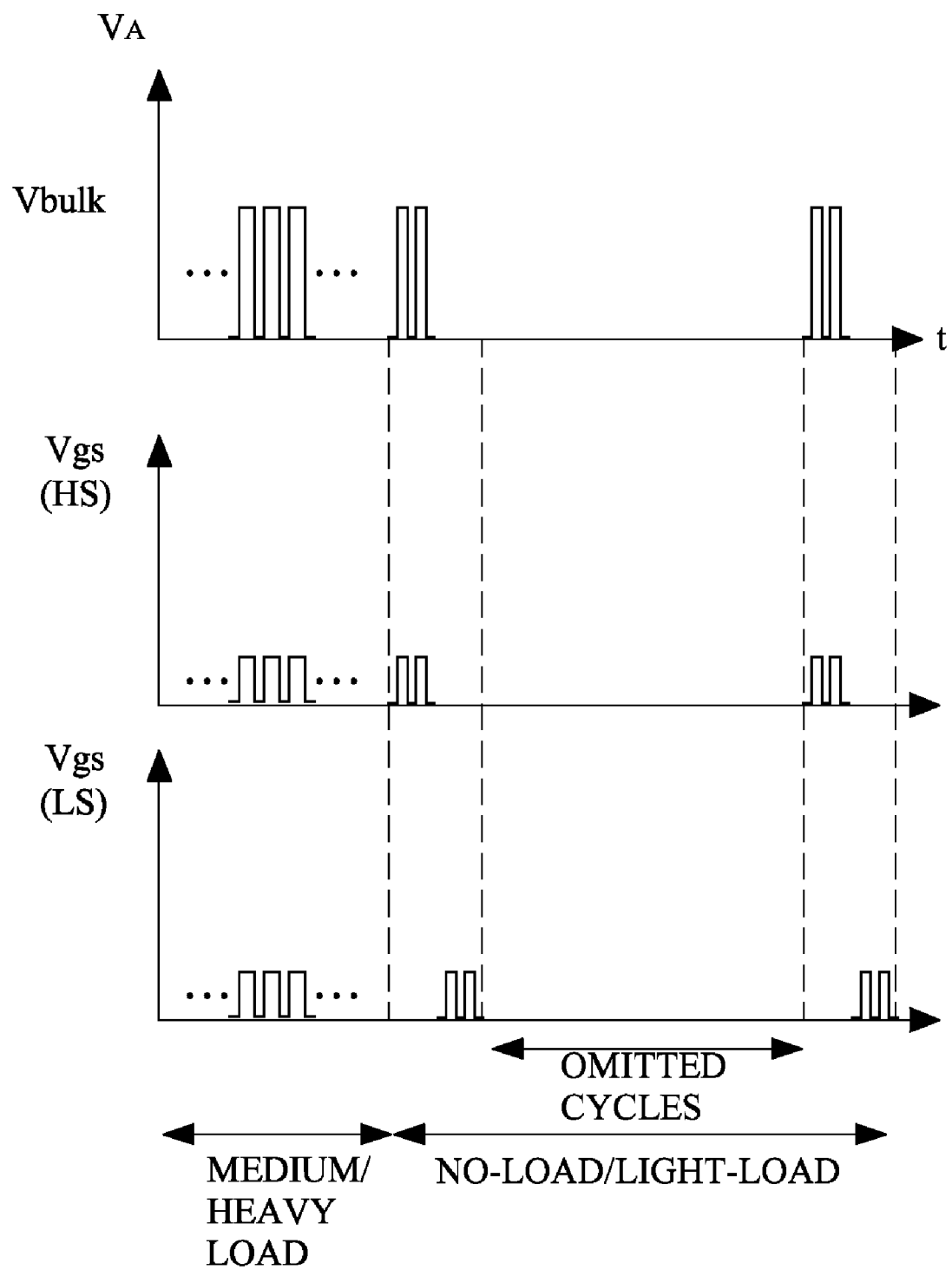
FIG. 3 shows the waveforms of two 50% pulse width signals and the energy-storing capacitor in FIG. 2.
Figure 6:
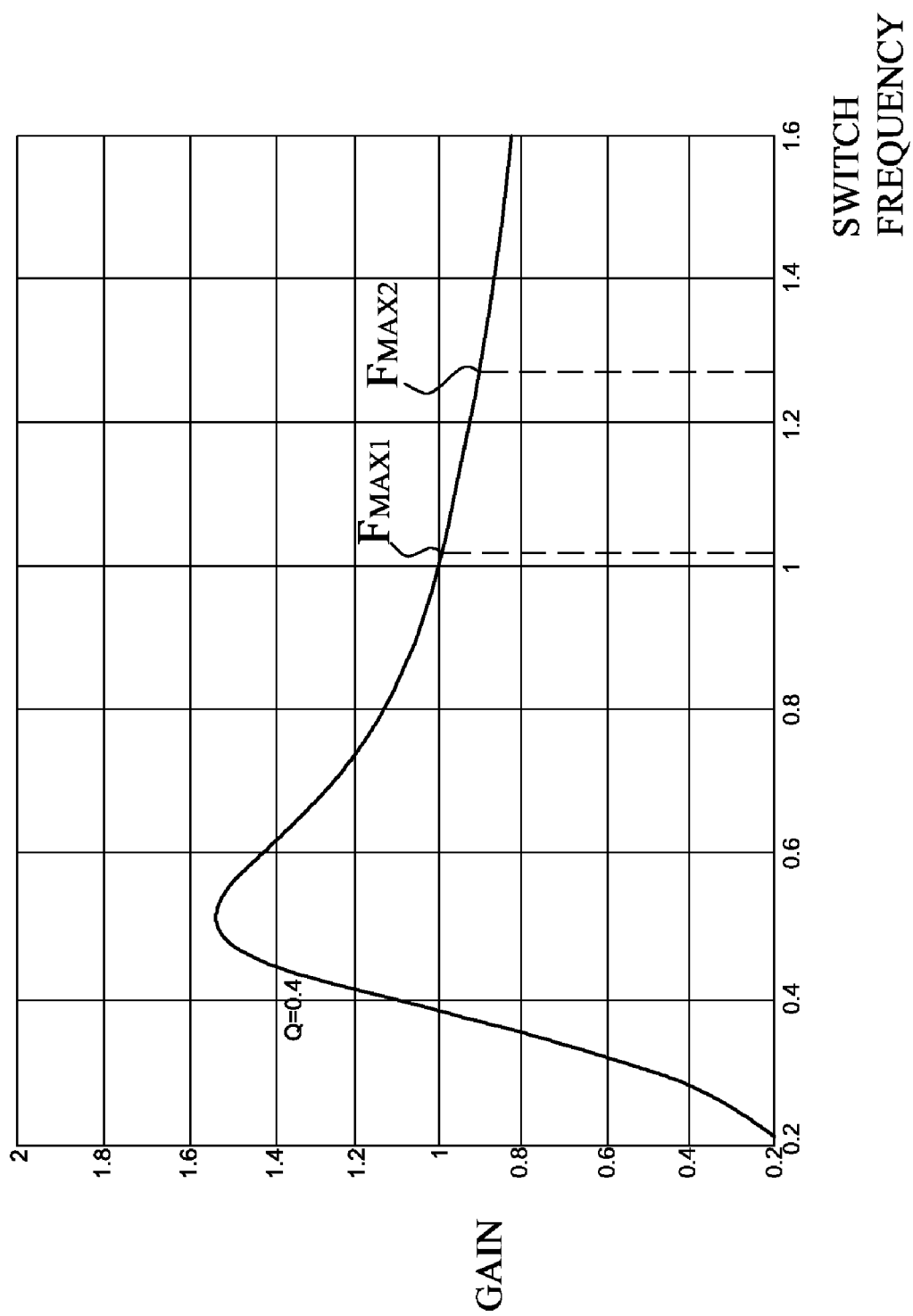
FIG. 6 shows the characteristic curve of the gain as a function of the switch frequency for the resonant controller.
Figure 7:
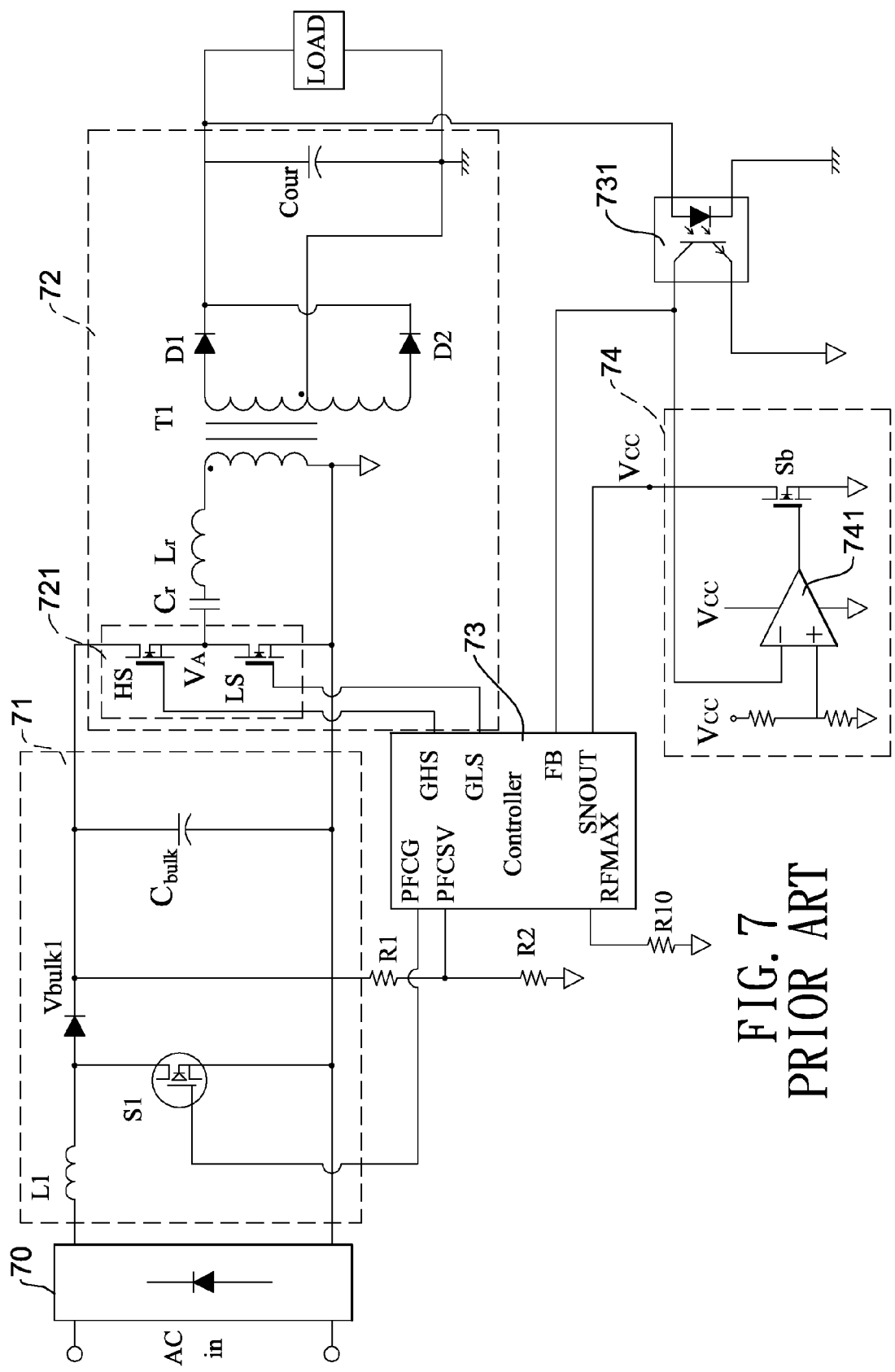
FIG. 7 is a circuit diagram of a conventional resonant circuit.
Figure 8:
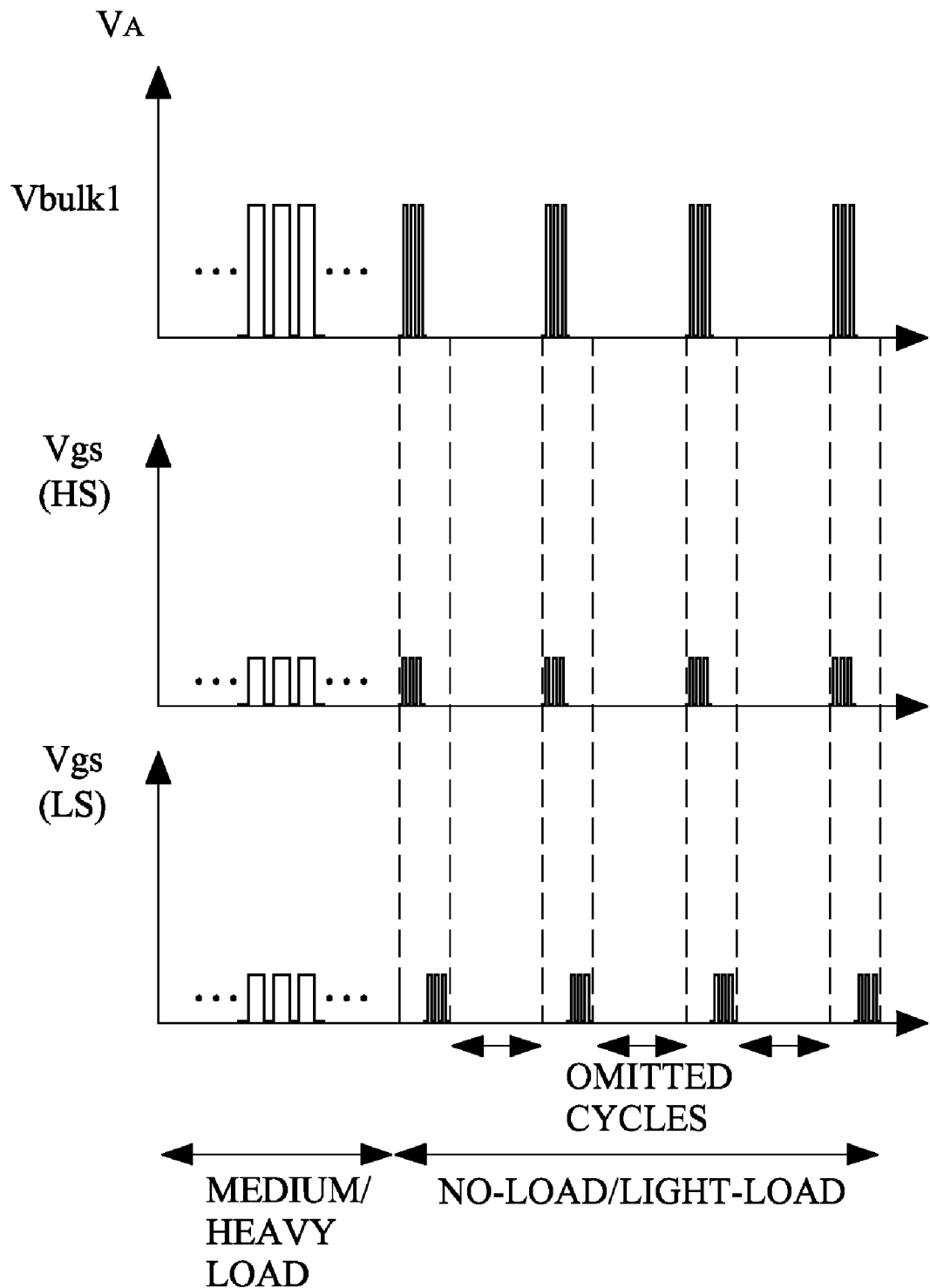
FIG. 8 shows the waveforms of the two 50% pulse width signals and the energy-storing capacitor in FIG. 7.
Figure 9:
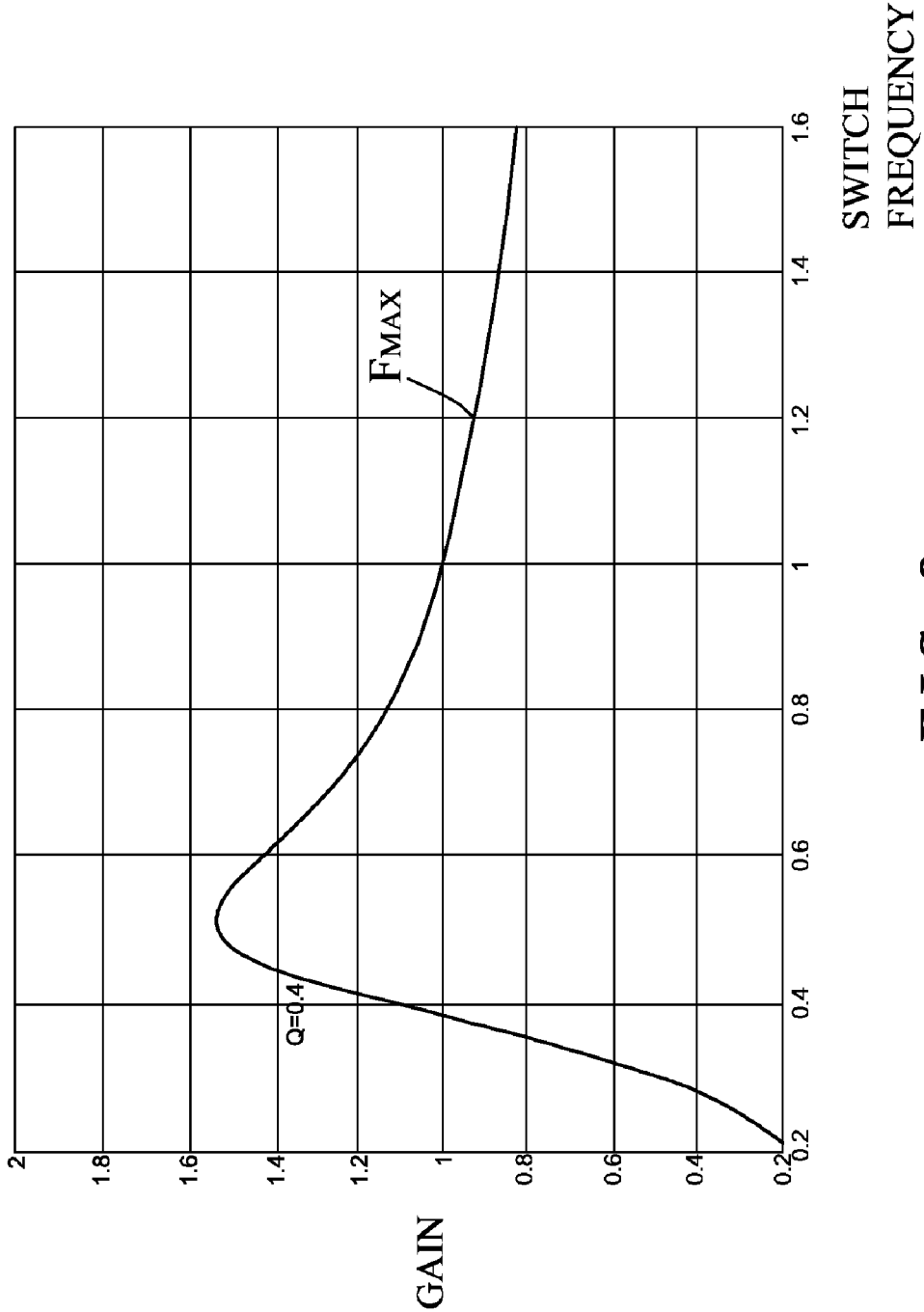
FIG. 9 shows a characteristic curve of the gain and the switch frequency of a controller in FIG. 7.

When the current load condition is the no-load condition or the light-load condition, the voltage on the filter capacitor $C_f$ drops and the switch Sa is off. Therefore, only the first resistor R10 is connected to the maximum switch frequency setting end of the resonant controller 40b. Therefore, the maximum switch frequency setting end RFMAX is connected to a high resistance. The maximum switch frequency $F_{MAX1}$ of the resonant controller 40b thus decreases. With reference to FIG. 6, when there is no load or light load, the switch frequency $F_{MAX1}$ of the resonant controller 40b decreases. Therefore, the resonant controller outputs two 50% pulse signals at current switch frequency to the corresponding high side switch HS and low side switch LS of the bridge switch circuit 31. With reference to FIG. 3, when the load condition is the no-load condition or the light-load condition, the resonant controller 40b enters the burst mode. That is, some cycles in each 50% pulse signal are omitted. More cycles are omitted than the conventional burst mode. This suppresses the increase in the output voltage when the power converter is under the no-load condition or the light-load condition. To maintain a necessary current in the no-load condition or the light-load condition, the resonant controller 40b is provided with the maximum frequency variable circuit 50 to elongate the conduction time of the 50% pulse signal in the burst mode.

As described above, when the load condition is the no-load condition or the light-load condition, the switch frequency $F_{MAX1}$ of the resonant controller 40b drops to reduce the switching cycles of the bridge switch circuit, effectively reducing the switching loss. Since more cycles are omitted, the conduction time is extended so that larger energy can be transmitted to the secondary coil of the transformer at a time. The current for maintaining the load is not sacrificed even though more cycles are omitted. Moreover, when the load returns from no-load or light-load to medium or heavy, the current necessary for the load increases. Therefore, more energy has to be supplied to the secondary coil of the transformer. As a result, the maximum frequency variable circuit 50 of the resonant controller 40b resumes its largest maximum switch frequency $F_{MAX2}$. This reduces the voltage or current ripples produced on the output end of the power converter because it cannot escape the burst mode. It can effectively increase the overall efficiency.

Figure 4:
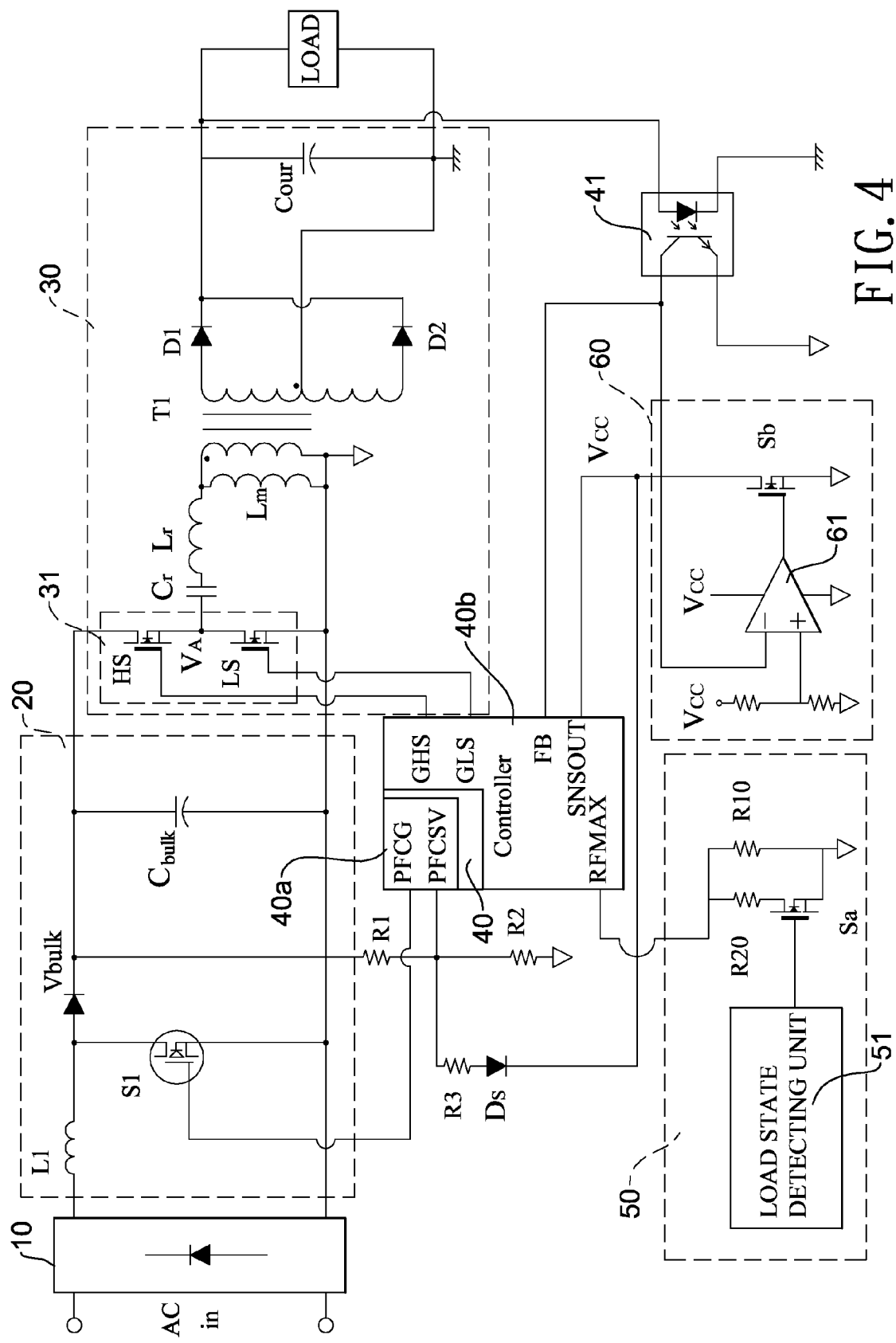
FIG. 4 is a circuit diagram of a second embodiment of the invention.

With reference to FIG. 4, in a second embodiment of the invention, the voltage divider R1, R2 connected to the reference voltage input end PFCSV of the controller 40 further includes a resistor R3 and a switch element Ds. The resistor R3 is connected to the electronic switch Sb of the burst mode triggering unit 60 via the switch element Ds. The switch element Ds is first connected in series with the resistor R3 and then to the voltage divider R1, R2, and the burst mode triggering unit 60, coupling to the electronic switch Sb thereof. The switch element Ds in this embodiment is a diode whose anode is connected to the resistor R3 and whose cathode is connected to the electronic switch Sb of the burst mode triggering unit 60.

Figure 5:
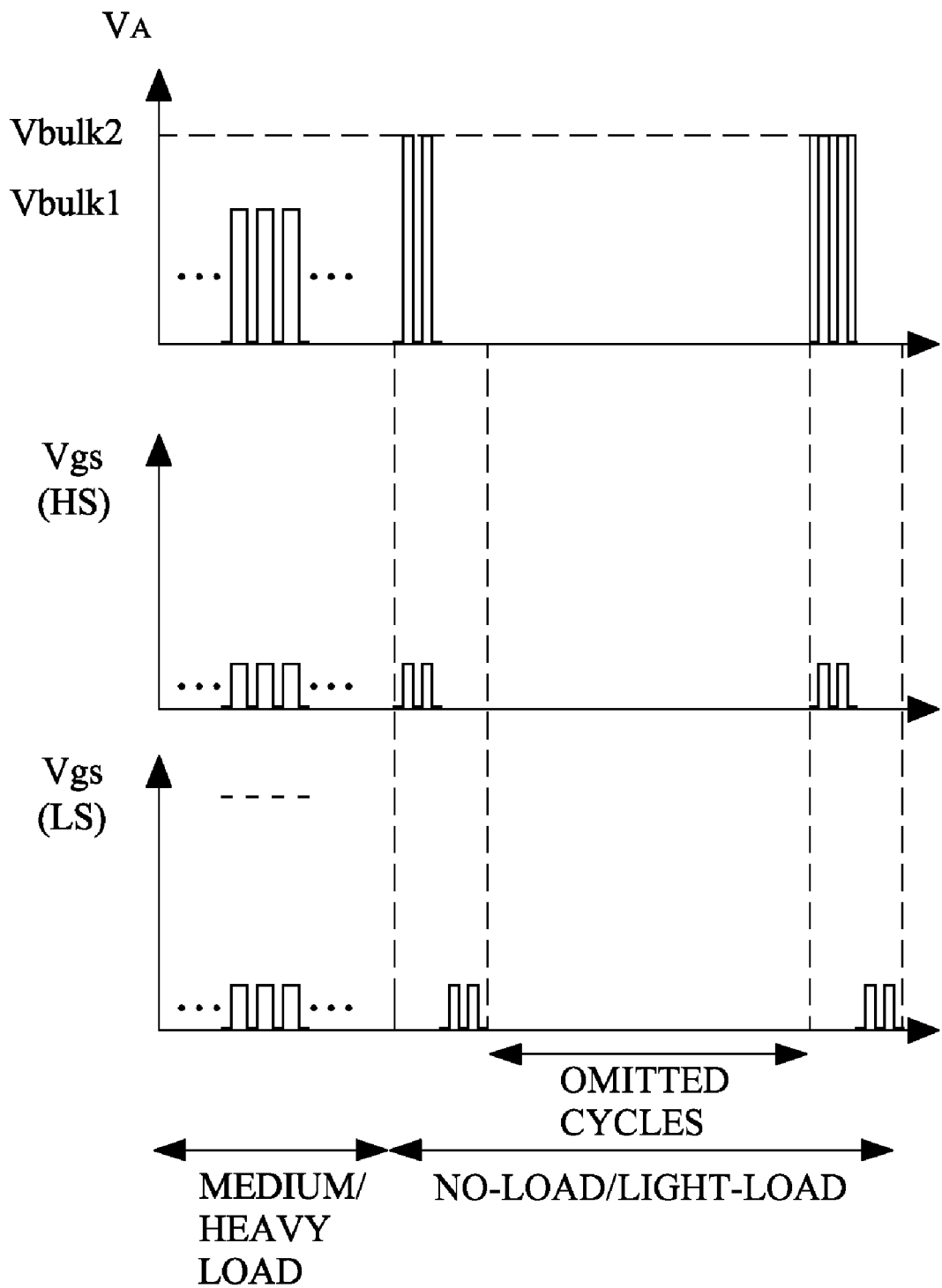
FIG. 5 shows the waveforms of two 50% pulse width signals and the energy-storing capacitor in FIG. 4.

When the burst mode triggering unit 60 determines the current load as low, the electronic switch Sb is turned on. The potential of the burst mode trigging end of the resonant controller 40b is ground. In this case, the switch element Ds is on so that the resistor R3 is connected in parallel with one resistor R2 of the voltage divider R1,R2, reducing the equivalent resistance. The reference voltage on the reference voltage input end PFCSV of the resonant controller 40a is changed. Since the change in the reference voltage of the resonant controller 40a controls the conduction time of the power switch S1, the voltage $V_{bulk}$ of the energy-storing capacitor $C_{bulk}$ rises. With reference to FIG. 5, as the conduction cycle of the bridge switch circuit 31 is controlled by the resonant controller 40b to become longer, more energy is delivered to the secondary side $V_A$ of the transformer during the conduction cycle. This stabilizes the voltage on the output end of the power converter and reduces the switching cycles to lower switching loss and increase power supply efficiency.

While the invention has been described by way of example and in terms of the preferred embodiment, it is to be understood that the invention is not limited to the disclosed embodi-

What is claimed is:

1. A burst mode resonant power converter with high conversion efficiency, comprising:
   a rectifier receiving an AC power for converting the AC power to sinusoidal DC power and outputting the sinusoidal DC power;
   a power factor correction (PFC) circuit detecting a voltage and a current of the sinusoidal DC power for adjusting a power factor thereof, and outputting DC power; wherein the PFC circuit comprises an energy-storing inductor, a power switch, a power factor controller, and an energy-storing capacitor, one end of the energy-storing inductor connected to an output end of the rectifier and the other end of the energy-storing inductor connected to the power switch and the energy-storing capacitor;
   a resonant circuit comprising a transformer, a resonant unit, a bridge switch circuit and an output capacitor; wherein the transformer has a primary coil and a secondary coil, the resonant unit is connected between the bridge switch circuit and the primary coil, the output capacitor is connected to the secondary coil, the resonant unit is connected to the bridge switch circuit, and the bridge switch circuit comprises a high side switch and a low side switch connected in series;
   a power factor controller comprising a reference voltage input end and an output end; wherein the reference voltage input end is connected to the energy-storing capacitor via a first voltage divider, and the output end is connected to the power switch of the PFC circuit;
   a resonant controller comprising multiple output ends, an output voltage feedback end, a maximum switch frequency setting end and a burst mode triggering end, wherein the output ends are connected to the power switch of the PFC circuit and the bridge switch circuit of the resonant circuit, and the output voltage feedback end is connected to the output capacitor of the resonant circuit via a photo coupler;
   a maximum frequency variable circuit connected to the maximum switch frequency setting end and coupled to the transformer for detecting a magnitude of a transformer current, determining a load state, and providing a maximum switch frequency that is lower than the maximum switch frequency for medium or heavy load when the load is in a no-load condition or a light load condition, wherein the maximum frequency variable circuit comprises:
      a load state detecting unit coupled to the transformer to detect its resonant current and thereby determining the load state;
      a first resistor connected to the maximum switch frequency setting end of the controller; and
      a second resistor connected with a switch in series and then both being further connected with the first resistor in parallel, with a control end of the switch connected to the load state detecting unit; and
   a burst mode trigging unit connected to the burst mode triggering end and the photo coupler and referring to a magnitude of a voltage output by the power converter to output a triggering signal to the burst mode trigging end when the load is in the no-load condition or the light load condition;
   wherein the burst mode trigging unit further comprises a comparator and an electronic switch, the comparator has an inverting input end connected to the photo coupler, a non-inverting input end connected to a fixed reference voltage, and an output end connected to the electronic switch to determine on and off of the electronic switch, and the electronic switch is connected to the burst mode triggering end of the controller.

2. The burst mode resonant power converter as claimed in claim 1, wherein the load detector comprises:
   an auxiliary coil coupled to the primary coil of the transformer and connected to the filter capacitor via a diode to detect the resonant current and convert it to a corresponding voltage; and
   a filter capacitor connected to the control end of the switch of the maximum frequency variable circuit.

3. The burst mode resonant power converter as claimed in claim 1, wherein the load state detecting unit comprises:
   a second voltage divider having two resistors connected in series and connected to the primary coil of the transformer; and
   a filter capacitor being connected in parallel with one of the resistors of the voltage divider, varying its voltage according to the current on the primary coil, the filter capacitor connected to the control end of the switch of the maximum frequency variable circuit.

4. The burst mode resonant power converter as claimed in claim 1, wherein the first voltage divider comprises:
   an upper resistor and a lower resistor connected in series, a node between the upper and the lower resistors is connected to the reference voltage end of the controller, and the upper resistor is connected to the energy-storing capacitor of the PFC circuit.

5. The burst mode resonant power converter as claimed in claim 2, wherein the first voltage divider comprises:
   an upper resistor and a lower resistor connected in series, a node between the upper and the lower resistors is connected to the reference voltage end of the controller, and the upper resistor is connected to the energy-storing capacitor of the PFC circuit.

6. The burst mode resonant power converter as claimed in claim 3, wherein the first voltage divider comprises:
   an upper resistor and a lower resistor connected in series, a node between the upper and the lower resistors is connected to the reference voltage end of the controller, and the upper resistor is connected to the energy-storing capacitor of the PFC circuit.

7. The burst mode resonant power converter as claimed in claim 4, wherein the first voltage divider is further connected with a resistor and a switch element, the resistor is connected to the electronic switch of the burst mode triggering unit via the switch, the switch element is connected in series with the resistor, connected to the first voltage divider, and coupled with the electronic switch of the burst mode triggering unit.

8. The burst mode resonant power converter as claimed in claim 5, wherein the first voltage divider is further connected with a resistor and a switch element, the resistor is connected to the electronic switch of the burst mode triggering unit via the switch, the switch element is connected in series with the resistor, connected to the first voltage divider, and coupled with the electronic switch of the burst mode triggering unit.

9. The burst mode resonant power converter as claimed in claim 6, wherein the first voltage divider is further connected with a resistor and a switch element, the resistor is connected to the electronic switch of the burst mode triggering unit via the switch, the switch element is connected in series with the resistor, connected to the first voltage divider, and coupled with the electronic switch of the burst mode triggering unit.

10. The burst mode resonant power converter as claimed in claim 8, wherein the switch element is a diode with its anode connecting to the resistor and its cathode connecting to the electronic switch of the burst mode triggering unit.

11. The burst mode resonant power converter as claimed in claim 9, wherein the switch element is a diode with its anode connecting to the resistor and its cathode connecting to the electronic switch of the burst mode triggering unit.

12. The burst mode resonant power converter as claimed in claim 1, wherein the secondary coil of the transformer is a center-tapped secondary coil.

13. The burst mode resonant power converter as claimed in claim 2, wherein the secondary coil of the transformer is a center-tapped secondary coil.

14. The burst mode resonant power converter as claimed in claim 3, wherein the secondary coil of the transformer is a center-tapped secondary coil.

15. The burst mode resonant power converter as claimed in claim 1, wherein the power factor controller and the resonant controller are integrated as a combined controller.

16. The burst mode resonant power converter as claimed in claim 2, wherein the power factor controller and the resonant controller are integrated as a combined controller.

* * * * *